United States Patent

Rivin

[11] Patent Number: 5,934,653
[45] Date of Patent: Aug. 10, 1999

[54] NONLINEAR FLEXIBLE CONNECTORS WITH STREAMLINED RESILIENT ELEMENTS

[76] Inventor: Evgeny I. Rivin, 4227 Fox Pointe Dr., West Bloomfield, Mich. 48323

[21] Appl. No.: 08/926,045

[22] Filed: Sep. 9, 1997

Related U.S. Application Data

[63] Continuation of application No. 08/380,684, Jan. 30, 1995, abandoned.

[51] Int. Cl.[6] .................................................. F16F 3/08
[52] U.S. Cl. ........................................................ 267/152
[58] Field of Search ............................ 267/141.3, 140.11, 267/140.3, 152, 153, 292, 142, 143, 145; 280/666, 668, 670, 671, 675, 685, 687, 696, 701, 716, 724; 5/653; 297/452.27, 452.37

[56] References Cited

U.S. PATENT DOCUMENTS

| | | | |
|---|---|---|---|
| 2,037,033 | 4/1936 | Lord | 267/141.6 |
| 2,775,998 | 1/1957 | Osborn | 267/145 |
| 2,826,244 | 3/1958 | Hurley | 267/145 |
| 3,751,111 | 8/1973 | Taylor | 297/452.37 |
| 5,474,362 | 12/1995 | Albecker | 297/452.37 |

*Primary Examiner*—Robert J. Oberleitner
*Assistant Examiner*—C. J. Bartz
*Attorney, Agent, or Firm*—Allen M. Krass

[57] ABSTRACT

A flexible connector for vibration isolators, dynamic vibration absorbers, and other vibration control devices for mechanical systems which is composed of streamlined elastomeric resilient elements with nonlinear load-deflection characteristics. These elements are embedded, possibly together with inserts, into a soft matrix which maintains relative positioning of the resilient elements and inserts while not significantly influencing deformation characteristics of the resilient elements. The inserts define the external shape and modify deformation characteristics of the connector, if necessary.

10 Claims, 3 Drawing Sheets

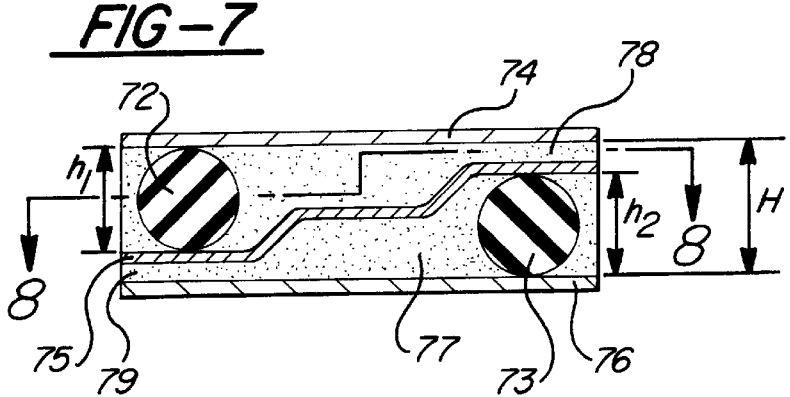
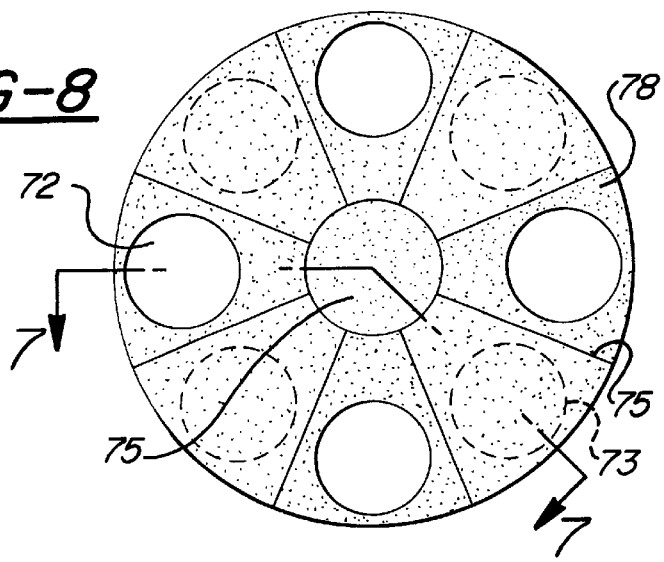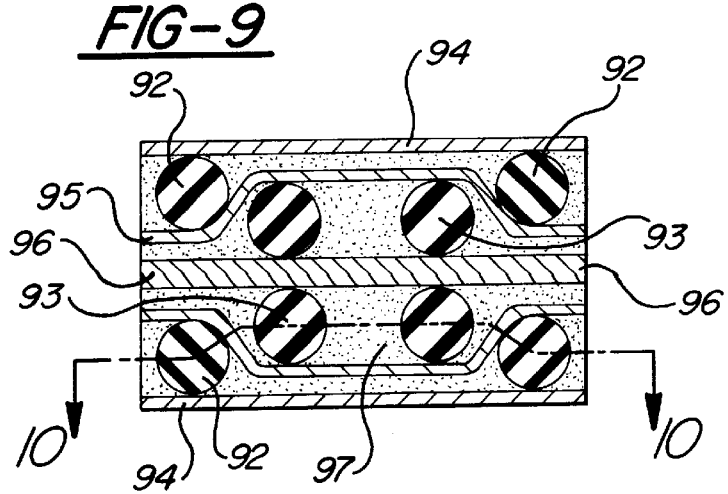

NONLINEAR FLEXIBLE CONNECTORS WITH STREAMLINED RESILIENT ELEMENTS

RELATED APPLICATION

This application is a continuation of application Ser. No. 08/380,684 filed Jan. 30, 1995, now abn.

FIELD OF THE INVENTION

The present invention relates to machine elements, especially to vibration isolators, to dynamic vibration absorbers and flexible connections for machines, instruments and apparatus serving for isolating vibration to and from this equipment or for connecting structural components of this equipment.

BACKGROUND OF THE INVENTION

Conventional flexible connectors, e.g. vibration isolators, consist of resilient elements (made of rubber, plastic, cork, metal springs, etc.) which are placed between the unit being isolated and the support structure, or between structural components. Frequently, the connector is designed as a self-contained unit in which the resilient element is attached to input and output (e.g., top and bottom) covers, thus resulting in an easy to handle block. The connectors are characterized by their stiffness in the orthogonal coordinate directions (e.g. X, Y, and Z). While lower stiffness (and resulting low natural frequencies of the vibration isolation system) in some or all of these directions are desirable, they are associated with larger displacements under steady loads (e.g. weight load of the isolated object, tangential forces in flexible couplings, etc.) and larger excursions under dynamic loads (e.g., dynamic vibratory loads transmitted from road disturbances to an automotive engine isolated by engine mounts). Large displacements and excursions, together with large overall dimensions of flexible connectors in the directions of these displacements/excursions require increased space for packaging. Such space is frequently not available (e.g., in engine compartments of surface vehicles). This precludes use of the low stiffness flexible connectors, such as vibration isolators which otherwise would provide more effective isolation of unwanted vibrations.

In allocating the packaging space for the elastomeric flexible connectors, it is universally accepted that scatter of their hardness within ±5 units of Shore durometer (approximately ±17% in stiffness) is allowable in most cases.

Especially critical is the packaging problem for flexible connectors with elastomeric (rubber) resilient elements loaded in compression by the weight load of the supported unit. Such mode of loading allows, on one hand, to accommodate large weight and other steady loads with relatively small cross sections of the resilient elements. On the other hand, allowable continuous compression deformation of rubber blocks bonded to covers is 10–15% (e.g., see Shock and Vibration Handbook, ed. by C. Harris, 1987, McGraw-Hill, N.Y., Ch.35). It means that the dimension of the block in the direction of the weight or other steady load is 7–10 times larger than its steady-load induced deformation, which is often unacceptable or inconvenient.

Also, an increasing continuous (static) deformation of a resilient rubber block bonded to its covers and loaded in compression must be accompanied by increasing of its dimensions not only in the direction of compression but in the perpendicular directions as well, due to buckling considerations. This effect further increases the overall dimensions and weight of isolators.

If the bonded rubber block is subjected to intensive dynamic exertions causing significant excursions, the stresses associated with these excursions are amplified due to known stress concentrations at the bonded interfaces between the rubber block and the covers (especially, in the corners).

It is known that the use of streamlined rubber elements such as balls, ellipsoids, toruses, radially-loaded cylinders, etc., allows to significantly (two-three times) increase the allowable continuous compression deformation (e.g., see Kerr, M. L. and Schmitt, R. V., "A New Elastomeric Suspension Spring," SAE paper 710058, 1971). Another advantage of such streamlined elements is their progressively non-linear deformation characteristic. These improvements are due to absence of bonding and also due to specifics of stress distribution in such elements. However, bonding of the streamlined elements into an integrated system which is essential for utilization of flexible connectors in the machine design practice, would negate the noted advantages. Such compromise solution (spherical rubber elements with modified apexes bonded to the cover metal plates) was produced, for example, by Lord Corp. under the trade name "Lastoflex."

The present invention addresses the inadequacies of the prior art by providing a self-contained flexible connector using streamlined elastometric elements without compromising their special deformation properties, which may be caused by their bonding to other elements. The connector is composed of a single or a plurality of streamlined rubber elements, possibly in combination with hard material (e.g, metal) elements or differently shaped rubber elements (inserts) structurally integrated into a self-contained block by a soft matrix not influencing, to an undesirable degree, deformations of the resilient rubber element under static and/or dynamic loads. Appropriately shaped attachment and fastening features (such as holes, shaped corners, recesses, etc.) can be made in the matrix and/or in the inserts. The matrix can be made of a flexible foam or a solid (non-foamy) material which is significantly softer than the resilient elements. This arrangement eliminates influence of friction at the supporting surfaces on deformation of streamlined rubber elements and also results in a self-contained integrated block which is easy to handle and use in assemblies, while assuring the desired relative positions of the resilient elements and not creating any stress concentrations. Use of hard material inserts in this block allows to tailor the desired stiffness ratios in different coordinate directions; to reduce the overall dimensions while achieving high deformations under static loads; and to modify load deflection characteristics in various directions by an appropriate shaping of the inserts.

SUMMARY OF THE INVENTION

The present invention provides a flexible connector for accommodating static and dynamic loads and/or misalignments between components or units of mechanical systems which is designed to utilize nonlinearity and high allowable loads and deformations of streamlined elastometric elements loaded in compression. The connector comprises at least one elastometric element of a streamlined shape (such as sphere, cylinder, torus, etc.) immersed in a matrix which is made of a material having a less resistance to deformation on the order of not more than about one sixth (in other words, not more than about 17% of the stiffness of) that of the elastometric element, and whose shape is determined by the design requirements of the flexible connection. The matrix material can be foam rubber or plastic, very soft rubber and plastic, soft natural or synthetic biomaterials, etc. When the connector is subjected to static and/or dynamic loading, the loads are accommodated, essentially, by the streamlined elastometric element(s) while the matrix assures relative location of the elements and their fit with the other structural components. If the inserts are utilized for modification of load-deflection characteristics of the connection for its attachment to other structural components, or for other design purposes, the matrix provides for their proper relative positioning. The matrix itself also provides required surfaces for attachment and fastening of the connector to the connected structural elements. The proposed flexible connector allows to utilize beneficial properties of the streamlined unbonded elastometric components (absence of stress concentrations, desirable nonlinear characteristics, high allowable deformations and loads), and in the same time to provide significant design flexibility, as well as manufacturing simplicity.

BRIEF DESCRIPTION OF THE DRAWINGS

The present invention can best be understood with reference to the following detailed description and drawings in which:

FIG. 7 is a cross-sectional view by D—D of yet another embodiment of the proposed invention showing a plurality of streamlined elastomeric elements integrated together with hard inserts by a soft matrix.

FIG. 8 is a cross section by C—C of the embodiment in FIG. 7.

FIG. 9 illustrates the proposed flexible connector comprising streamlined elastomeric elements of various shapes.

DETAILED DESCRIPTION OF THE PREFERRED EMBODIMENTS

Figure 1:
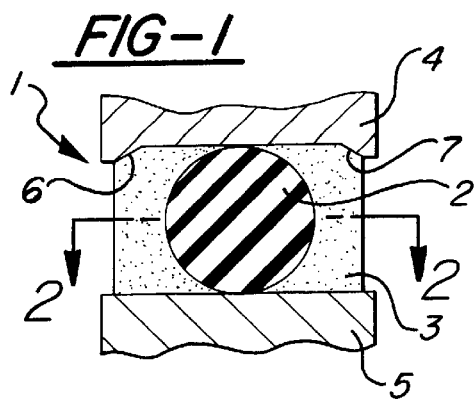
FIG. 1 is a cross-sectional view of one embodiment of the proposed invention showing one streamlined elastometric element embedded in a soft matrix.
Figure 2:
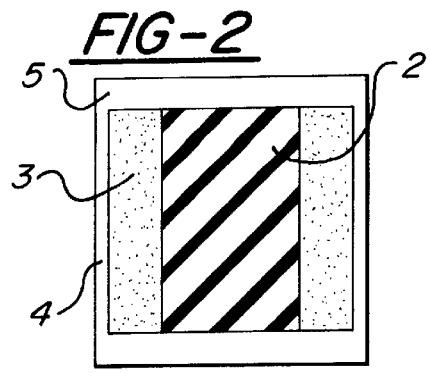
FIG. 2 is an axial cross section by A—A of the embodiment in FIG. 1.

FIGS. 1 and 2 illustrate the proposed flexible connector 1 composed of elements 2 and 3. Rubber cylinder 2 (resilient element) is encased into block 3 of soft porous or soft solid material. Block 3 can be cast, e.g., using silicone "room temperature vulcanization" flexible foam, or assembled from previously formed components. The shape of block 3 is conforming with the shapes of structural components 4, 5 being connected by flexible connector 1. As it can be observed from FIG. 1, the lower attachment surface (with element 5) is flat, while the proper location in relation to element 4 is provided by fitting slopes 6 and 7. Resilient element 2 may be bonded to material of block 3 or just fitted in the shaped cavity.

In operation, resilient element 2 is accommodating static and dynamic loads between connected structural components 4 and 5 in all directions while utilizing the advantages of its streamlined (cylindrical in this case) shape. Block 3, made of a much softer material than element 2, does not contribute significantly to stiffness and damping of the connector, and these parameters are determined by the appropriately designed resilient element 2. The general industry standard for allowable variation of hardness of elastomeric elements due to production uncertainties is within ±5 units of Shore durometer for rubber-like materials (equivalent to approximately ±17% variation of stiffness). This tolerance range can be reduced by improvements in the production technology, to about ±10% stiffness variation. In such circumstances, stiffening of the flexible connector by about 10–17% due to restraint from the holding matrix can be tolerated. This is equivalent to the statement that the holding matrix is on the order of at least six times less stiff than the embedded in it streamlined elastomeric elements. The role of block 3 is to properly and securely locate resilient element 2 in relation to the connected structural components 4 and 5. Another role of block 3 is to facilitate handling and installation of connector 1.

Figure 3:
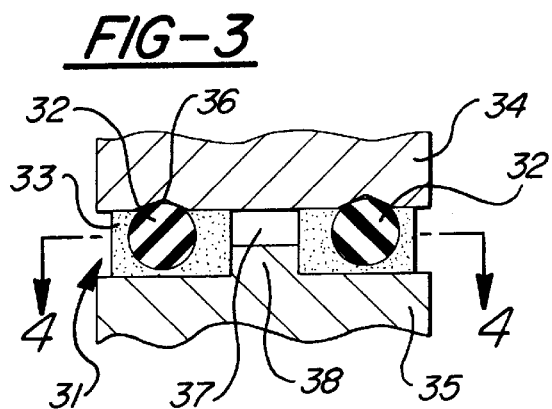
FIG. 3 is a cross-sectional view of another embodiment of the proposed invention showing several streamlined elastomeric elements partially embedded in a soft matrix.
Figure 4:
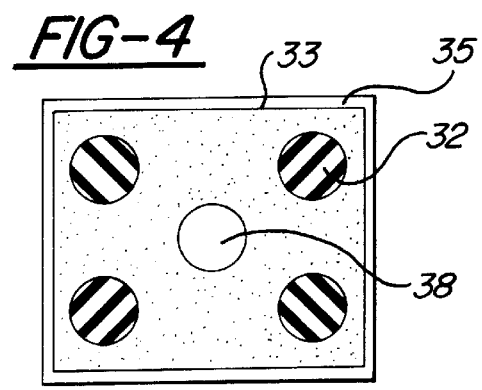
FIG. 4 is a cross section by B—B of the embodiment in FIG. 3.

In the embodiment shown in FIGS. 3, 4, resilient element of flexible connector 31 is composed of rubber spheres 32 partially embedded in block 33 made of a soft material, and is located between structural components 34 and 35. The protruding apexes of spheres 32 are engaged with location dents 36 made on the supporting surface of structural component 34. Hole 37 in block 33 is engaged with guiding pin 38 provided on structural component 35.

In this embodiment several streamlined rubber elements (spheres) 32 are used, and the task of locating the flexible element 31 in relation to the connected structural components 34 and 35 is shared between spheres 32 which are engaged with dents 36 and block 33 having hole 37 engaging with pin 38 on one structural component.

Figure 5:
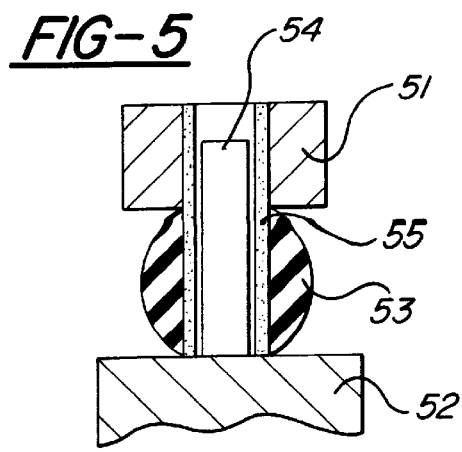
FIG. 5 is a cross-sectional view of an embodiment of the proposed invention in which the soft matrix is partly placed inside a streamlined elastomeric element.

FIG. 5 shows a flexible connector for inertia mass 51 of a dynamic vibration absorber. Inertia mass 51 is interacting with supporting structure 52 via elastomeric sphere 53. Sphere 53 and inertia mass 51 have central holes to accommodate guiding pin 54. Tubular foam element 55 locates guiding pin 54 in sphere 53 and in inertia mass 51 while assuring that there is no direct contact between pin 54 (which is a part of supporting structure 52) and inertia mass 51 and sphere 53.

The flexible connector in this case consists of elastomeric sphere 53 and tubular element 55 which serves in this case as the soft matrix. Presence of element 55 allows for free deformations of sphere 53 under weight of inertia mass 51 and under vibration-induced dynamic loads without being influenced by friction forces between the hole surface of sphere 53 and surface of guiding pin 54. In addition, tubular element 55 eliminates friction between moving inertia mass 51 and guiding pin 54 while providing a desired positioning of inertia mass along pin 54.

Figure 6:
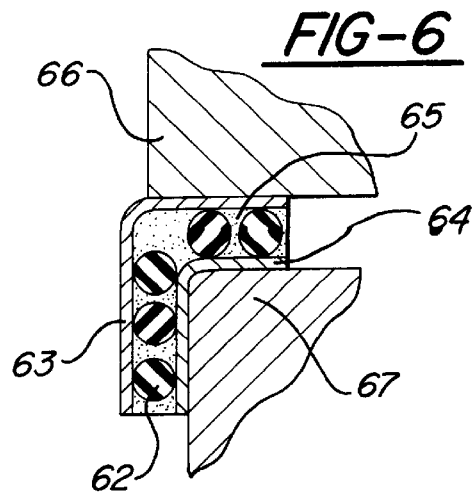
FIG. 6 is a cross-sectional view of an embodiment of the proposed invention in which shapes of hard inserts allow to utilize compression loading of the streamlined elastomeric elements in two directions.

FIG. 6 illustrates another embodiment of flexible connector 61 in which elastometric cylinders 62 are located between hard material covers 63 and 64 and integrated by soft matrix 65. Connector 61 is inserted between structural components 66 and 67.

This flexible connector allows the realization of complex requirements to stiffness values in different directions of flexible connections between the structural components while using beneficial performance characteristics of streamlined elastomeric elements.

FIGS. 7, 8 show yet another flexible connector 71 in which elastomeric elements 72, 73 (rubber spheres) are integrated with hard covers 74 and 76 and one intermediate insert 75 by soft matrix material 77. Intermediate insert 75 is in contact with both sets of elements 72 and 73. Elements 72 can be compressed within clearance 78, while elements 73 can be compressed within clearance 79. Dimensions of these clearances are determined by dimensions of spheres 72, 73, as well as by designed shapes of insert 75 and covers 74, 76. Covers 74 and 76 can also be considered as inserts. While only two covers 74 and 76 and one hard insert 75 interacting with elastomeric elements 72 and 73 is shown in FIGS. 7, 8, additional inserts (not shown in FIGURES), made of materials of various hardness, shaped in accordance with the design needs, and contacting (interacting) with elastomeric elements can be used to modify load-deflection characteristics of the flexible connector in various directions.

The embodiment in FIGS. 7, 8 utilizes beneficial features of deformation characteristics of the streamlined rubber elements 72, 73 while providing an integrated flexible connector having a very large allowable compression deformation in the axial direction combined with relatively small axial dimension. This effect is achieved due to serial connection of elements 72 and elements 73 in the direction of maximum compression loading, e.g., by weight. Elements 72 and 73 are arranged in a staggered fashion thus reducing the axial dimension. Dimensions of clearances 78 and 79 can be designed to limit the maximum compression of elements 72 and 73 and "locking" the system in a solid contact between hard inserts 74, 75 and 76, 75. These clearances can be made of different dimensions thus providing a gradual increase in stiffness. Elements 72 can have different dimensions and shapes than elements 73.

In this embodiment streamlined elastomeric elements 72, 73 together with hard inserts 74, 75, 76 provide the required performance characteristics while soft matrix 77 assures proper positioning of all constitutive components and integrates them into a self-contained flexible connection which can be easily assembled with other structure components. Due to the staggered arrangement of elements 72 and 73, the total initial (before loading) axial dimension H of the aggregate of resilient elements 72 and 73 between their apexes is smaller than the sum $h_1+h_2$ of axial dimensions of resilient elements 72 and 73 on the projection of flexible connector 71 to the plane perpendicular to the planes of residence of resilient elements 72 and 73.

Figure 10:
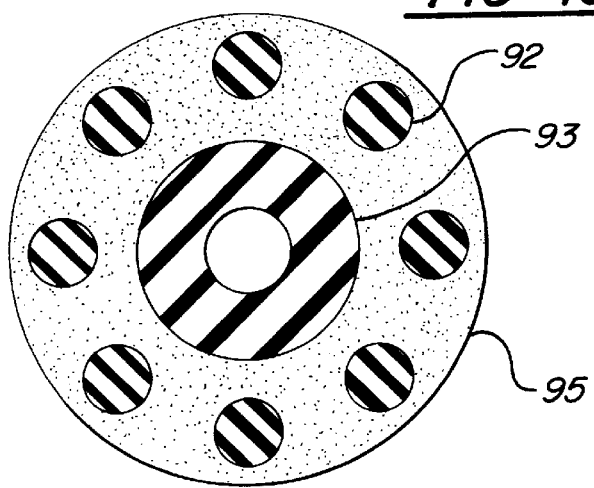
FIG. 10 is a cross-sectional view by E—E of the embodiment shown in FIG. 9.

FIGS. 9, 10 illustrate flexible connector 91 which utilizes streamlined elastomeric elements of mixed shapes. Elastomeric spheres 92 are situated between hard material covers 94 and inserts 95; elastomeric toruses 93 are situated between inserts 95 and 96. The connection is integrated by a soft matrix 97.

This embodiment provides double displacement as compared with the embodiment in FIGS. 7, 8 but with less than double axial dimension, since intermediate insert 96 has a smaller thickness than two covers 74, 76 in embodiment of FIGS. 7, 8 if two latter connectors were used in tandem. Inclined shape 98 of inserts 95 provides enhancement of horizontal stiffness. Multiple spheres 92 are used on the periphery of the connector to compensate for higher load-carrying capacity of torus 93.

Figure 11:
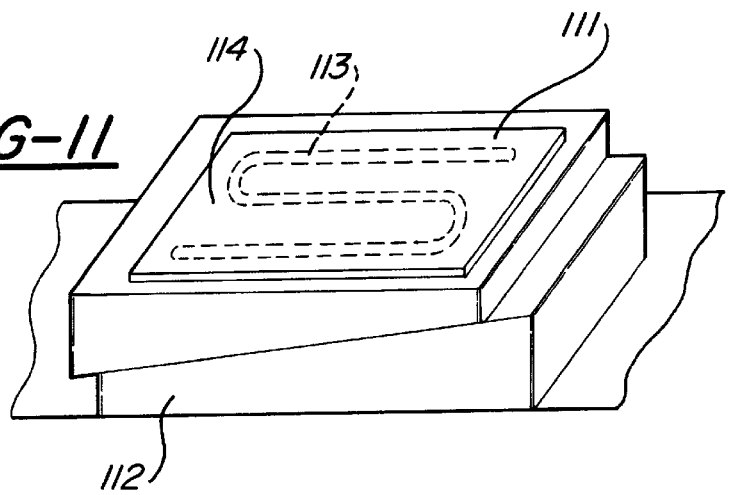
FIGS. 11 and 12 present embodiments of the proposed flexible connector for use as vibration isolation pads.
Figure 12:
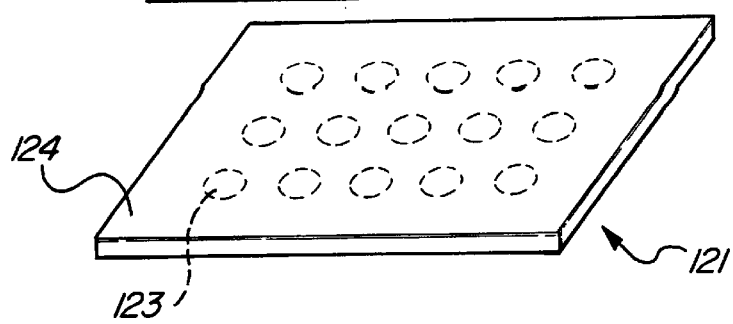

FIG. 11 shows a flat vibration isolation pad (mat) in which rubber cord 113 is placed on a flat surface and kept in a designed shape by foam matrix 114. While a serpentine pattern of cord 113 is shown, it can be arranged in other geometrical shapes, e.g. as a spiral, or the pattern of cord can be generated by several cord pieces. FIG. 12 shows another pad 121 for lower load ratings, in which multiple rubber spheres (balls) 123 are positioned in a planar arrangement and surrounded by holding matrix 124. The pads shown in FIGS. 11 and 12 can be placed directly under the objects being isolated, such as machines, or under foundation blocks, or as cushioning pads for levelling (e.g., wedge) mounts. For the latter application, which is illustrated in FIG. 11 (pad 111 is placed on top of wedge 112) the preferable thickness of cord or balls is about ¹⁄₁₆–¼ inch, while for the applications where the pads are placed directly under machines or foundation blocks, thickness about ¼–1.0 inches would be frequently preferable.

The foam holding matrix, 114 in FIG. 11 and 124 in FIG. 12 should, preferably, have a thickness within ±15–20% of the diameter of cord 113 or balls 123. If the holding matrix is too thin, its holding ability would be undesirably diminished, if it is too thick, it may undesirably modify stiffness and dynamic characteristics of the vibration isolation pad.

It is readily apparent that the components of the nonlinear connections disclosed herein may take a variety of configurations. Thus, the embodiments and exemplification's shown and described herein are meant for illustrative purposes only and are not intended to limit the scope of the present invention, the true scope of which is limited solely by claims appended hereto.

We claim:

1. A vibration control system for time varying loads, comprising separated first and second rigid structural components positioned to define a loading axis extending between said structural elements, a flexible vibration control element formed of a relatively rigid elastomeric body having a cross-section in the plane of the loading axis chosen from the group consisting of substantially circular and substantially elliptical so as to provide a progressively nonlinear deformation characteristic in response to loading said body, having separated portions of its surface substantially abutting said first and second structural components in the absence of load, so that the load imposed between such structural components is transmitted essentially entirely through said vibration control element normally to its surface, and a resilient matrix formed of a material having not more than about one-sixth the hardness of said vibration control element, the matrix having surface areas in contact with the surface of said vibration control element so as to control the position of said vibration control element relative to said rigid structural components without significantly restraining load responsive deformation of said vibration control element in directions transverse to the loading axis, whereby the specially advantageous deformation properties of the vibration control element are not compromised by its joinder with the matrix.

2. A flexible connector of claim 1 in wherein said matrix is made of a flexible foam material.

3. The flexible connector of claim 1, comprising: at least one insert disposed within said matrix and shaped to provide modification of the load-deflection characteristics of said vibration control element, whereby said matrix embeds said vibration control element and said insert in the required positions in relation to each other and to said rigid structural components.

4. The flexible connector of claim 1 in which at least one of the separated portions of the surface of the flexible vibration control element is in contact with one of the first and second structural components.

5. The flexible connector of claim 4 which both of said separated portions of the surface of the vibration control element are in contact with the first and second structural components.

6. The flexible connector of claim 4 which the separated portion of the surface of the flexible vibration control element in contact with one of the first and second structural elements is bonded to said contacted structural element.

7. The flexible connector of claim 5 in which both of said separated portions of the surface of the vibration control element are bonded to the structural components.

8. The vibration control system of claim 1 further comprising a plurality of flexible vibration control elements disposed in two parallel planes perpendicular to the loading axis and an intermediate insert disposed between said parallel planes and in contact with all of said resilient elements.

9. The vibration control system of claim 1 wherein said flexible vibration control element comprises a cylindrical cord arrayed in a sinuous form in a plane perpendicular to the loading axis.

10. The vibration control system of claim 9 in which said cord has a diameter within the range of about $1/16$–1.0 inches and the thickness of said matrix perpendicular to the loading axis is within approximately ±15% of the diameter of said cord.

* * * * *